May 17, 1955
C. L. COOK ET AL
2,708,397
ARTICULATED FRAME FOR FOUR-ROW PLANTER
FRAME AND MEANS FOR CONSTRUCTING SAME
Filed Jan. 11, 1950
2 Sheets-Sheet 1
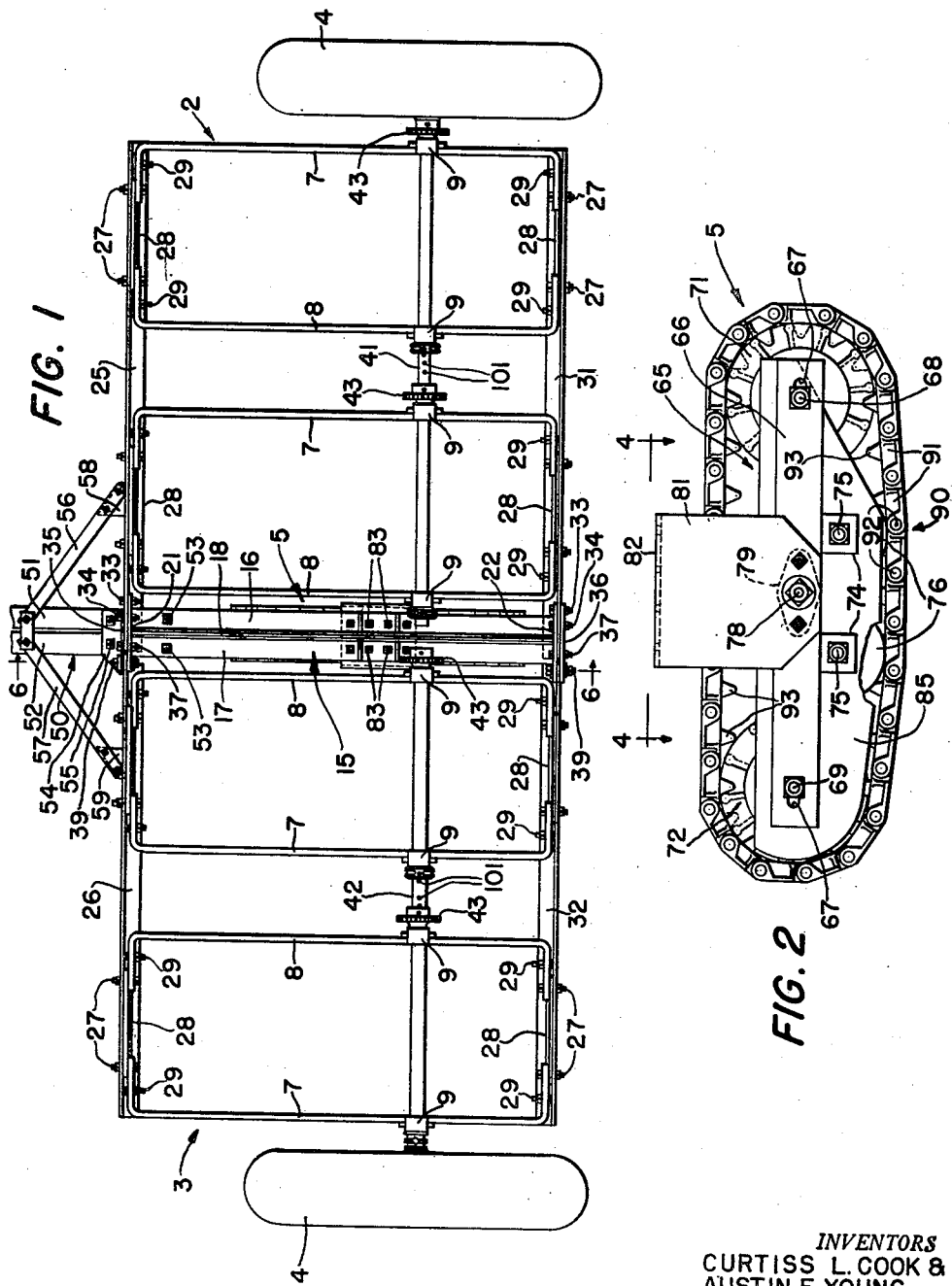
INVENTORS
CURTISS L. COOK &
AUSTIN E. YOUNG
BY
ATTORNEYS

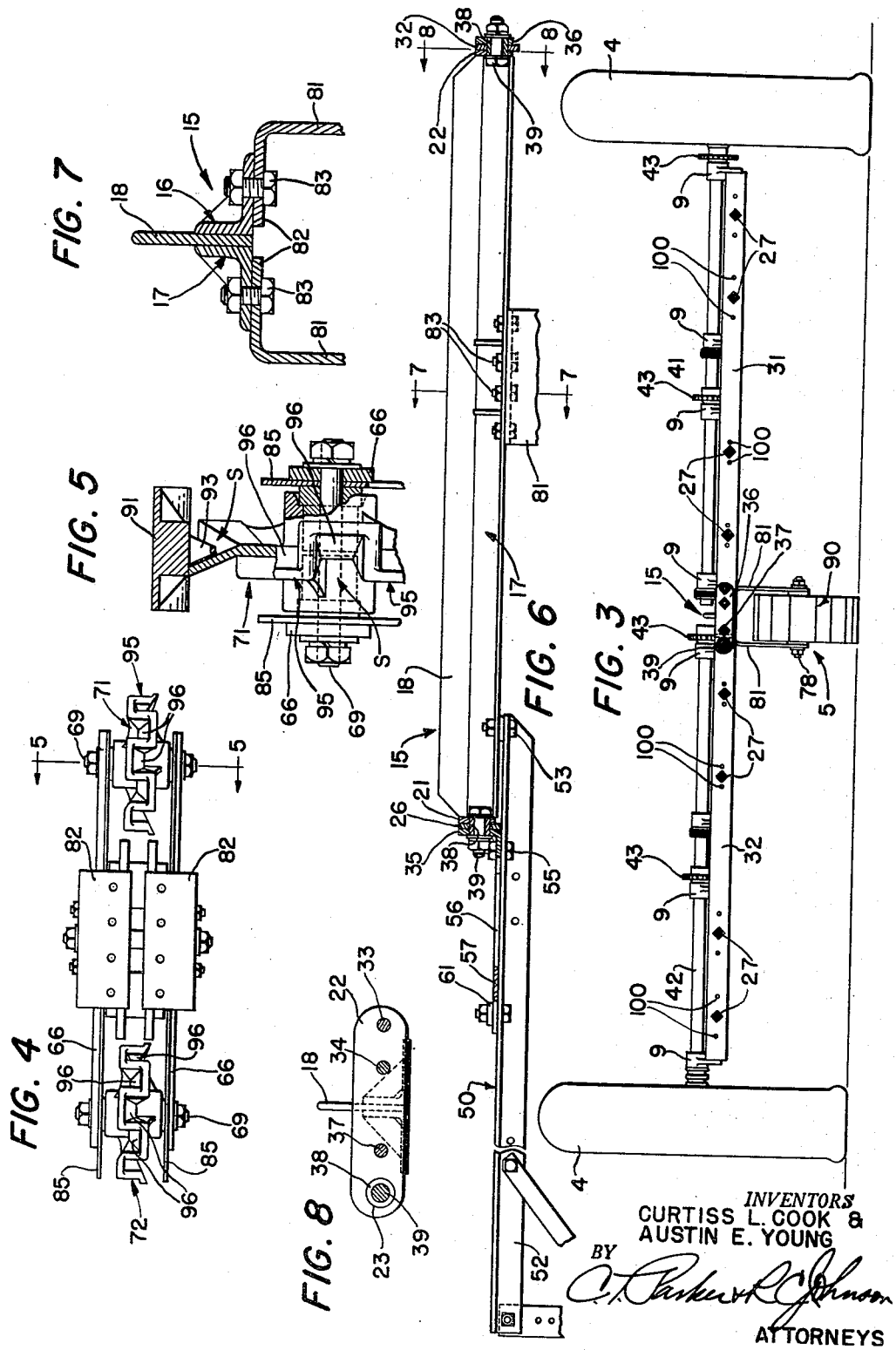

United States Patent Office 2,708,397
Patented May 17, 1955

2,708,397

ARTICULATED FRAME FOR FOUR-ROW PLANTER FRAME AND MEANS FOR CONSTRUCTING SAME

Curtiss L. Cook and Austin E. Young, Syracuse, N. Y., assignors, by mesne assignments, to Deere & Company, Moline, Ill., a corporation of Illinois Application January 11, 1950, Serial No. 138,018

4 Claims. (Cl. 97—235)

The present invention relates generally to agricultural implements and more particularly to potato planters and the like.

The object and general nature of the present invention is the provision of a four-row potato planter constructed primarily from two largely conventional two-row potato planters. More specifically, it is an important feature of this invention to provide a four-row potato planter which includes two substantially conventional two-row potato planter frames, with ground wheels at the laterally outer sides of said frames and with a crawler track unit disposed generally centrally between the ground wheels for supporting the laterally inner portions of the two two-row planter frames. Still further, it is a feature of this invention to provide a new and improved crawler track structure in which the track-receiving wheels are so constructed and arranged as to eliminate substantially entirely any possibility of soil adhering to the track-receiving wheels and causing the tracks to bind and jam on the wheels.

These and other objects and advantages of the present invention will be apparent to those skilled in the art after a consideration of the following detailed description of the preferred embodiment, taken in conjunction with the accompanying drawings in which said embodiment has been illustrated.

In the drawings:

Figure 1 is a plan view of the pertinent structure of a four-row potato planter constructed according to the principles of the present invention;

Figure 2 is a detail view of the crawler track unit upon which the laterally inner portions of the two two-row potato planter frames are supported for pivotal movement about a generally fore and aft extending axis;

Figure 3 is a rear view of the structure shown in Figure 1;

Figure 4 is an overhead view of a portion of the crawler track structure, taken generally along the line 4—4 of Figure 2;

Figure 5 is a view taken generally along the line 5—5 of Figure 4 showing, additionally, a portion of the crawler track links;

Figure 6 is a sectional view, taken generally along the line 6—6 of Figure 1;

Figure 7 is an enlarged sectional view taken along the line 7—7 of Figure 6; and Figure 8 is a sectional view taken generally along the line 8—8 of Figure 6.

Referring now to the drawings, the present invention contemplates the arrangement of two two-row planter frames 2 and 3 so as to form a four-row potato planter having two laterally outer end wheels 4 and a centrally disposed crawler track unit 5 forming the principal supporting means for the four planter units. Each of the two two-row planter frames 2 and 3 is of substantially the same construction, being similar to that shown in U. S. Patent 2,051,162, issued August 18, 1936 to Curtiss L. Cook, and each includes two generally longitudinally extending channel members 7 and 8 having their ends bent at right angles and connected together by any suitable means. Each pair of planter frame bars 7 and 8 carries a pair of axle-receiving bearing members 9 fixed to the channel members 7 and 8 in any suitable way. The present invention is not concerned with the particular details of the planting and associated mechanisms. Such planting and associated mechanisms may be substantially like that shown in U. S. Patent 2,091,432, issued August 31, 1937 to Curtiss L. Cook, to which reference may be made if necessary.

According to the principles of the present invention, we interconnect the two two-row planter frames 2 and 3 by structure which will now be described. Disposed generally centrally between the laterally inner frame bars 8 and extending in a generally fore and aft direction is a central frame member 15 which is made up of a pair of angle bars 16 and 17 arranged with their lower flanges in the same horizontal plane and upper flanges disposed in spaced-apart vertical planes and secured, as by welding, to a vertical fore and aft extending bar or plate member 18. The bar member 18 is of substantially the same length as the angles 16 and 17, and secured, as by welding, to the front ends of these parts is a front transverse end plate 21. A similar transverse end plate 22 is secured, as by welding, to the rear ends of the angles 16 and 17 and the reenforcing bar 18. The end plates 21 and 22 extend laterally outwardly of the angles 16 and 17 at opposite sides thereof, and, as best shown in Fig. 8, the end plates 21 and 22 are provided with a pair of apertures at one side of the frame member 15 and at the other side thereof the end plates 21 and 22 are provided with a pair of openings, one opening 23 of which is larger than the other openings.

A pair of front rails, including a right-hand front rail 25 and a left-hand front rail 26, are bolted, as at 27, to the front ends of the two sets of planter frame channel members 7 and 8 at each side of the machine. The laterally inturned portions at the front ends of the frame channel members 7 and 8 may be interconnected by a connector bar 28 by pairs of bolts 27, 29. The rear ends of the bars 7 and 8 of each of the four frame sections are connected together by parts which are substantially identical with those just described, and hence the same reference numerals are employed where applicable. A pair of rear rails 31 and 32, which may be substantially the same as the front rails 25 and 26, are connected by bolts 27 to the rear ends of the several frame bars 7 and 8. The right-hand front and rear rails 25 and 31 are fixed rigidly to the front and rear end plates 21 and 22 of the central frame member 15 by any suitable means, such as a pair of bolts 33 and 34 which extend through the right-hand pair of openings in the front and rear end plates 21 and 22, through a correspondingly spaced pair of openings in the left-hand portions of the front and rear rails 25 and 31, and through similar sets of openings in outside front and rear end plates 35 and 36. As best shown in Figure 1, the inner ends of the right-hand front and rear rails 25 and 31 extend substantially entirely across the central frame angles 16 and 17, and auxiliary bolts 37 cooperate with the bolts 33 and 34 for rigidly fixing the front and rear rails 25 and 31 and the front and rear inside end plates 35 and 36 to the transverse front and rear end plates 21 and 22. The inner ends of the left-hand front and rear rails 26 and 32 are apertured at 23 to receive a bushing 38 which is fixed in position between the inside and outside end plates 35, 36 and 21, 22 by means of bolts 39. By virtue of the means just described the left-hand two-row planter frame is connected for swinging movement about a fore and aft extending axis, as defined by the bolts 39, relative to the right-hand two-row planter frame, the pivotally connected inner ends of the two frames being carried on the central frame member 15.

A pair of right- and left-hand axles 41 and 42 are rotatably received in the associated bearing members 9, these axle members being similar to but slightly shorter than the axle members for the two-row planter of the type shown in the Cook Patent 2,051,162. The laterally inner ends, therefore, of the axle members 41 and 42 terminate at the central fore and aft extending frame member 15, each axle member having a pair of sprockets 43 fixed thereto for driving the four planter mechanisms (not shown). Each axle member 41 and 42 extends laterally outwardly of the outermost bearing member 9 and fixedly receives the associated laterally outer ground wheel 4. The journal members 9 are so located on the frame bars 7 and 8 that the right- and left-hand axle members 41 and 42 are disposed in axial alignment, as best shown in Figure 1.

As best shown in Figures 1 and 6, a pole or tongue section 50 is rigidly connected to the central frame member 15. Preferably, the pole or tongue section 50 comprises a pair of angles 51 and 52 connected back-to-back with their horizontal flanges disposed upwardly and connected by a pair of bolts 53 to the angles 16 and 17 rearwardly of the front end of the frame member 15. The forward outer transverse end plate 35 constitutes a tongue support part and preferably is in the form of an angle having a horizontal flange 54 which is connected by a pair of bolts 55 to the pole angles 51 and 52, the latter being maintained by any suitable means in laterally spaced relation corresponding to the lateral spacing between the frame angles 16 and 17. The tongue section 50 is reenforced by a pair of diagonal braces 56 and 57 which are bolted at their rear ends to a pair of brackets 58 and 59 that are fixed, respectively, to the front frame rails 25 and 26. The forward ends of the brace members 56 and 57 are connected by bolts and a transverse strap member 61 to the pole angles 51 and 52 with sufficient looseness to accommodate the pivoting of the right- and left-hand frames as mentioned above.

The central fore and aft extending frame member 15 is disposed, as best shown in Figure 3, substantially in the horizontal planes of the right- and left-hand two-row planter frames. The central frame member 15 is carried on the crawler track unit 5 which comprises a track frame 65 made up of a pair of track rails 66 slotted at their ends, as at 67, to receive front and rear axles 68 and 69 on which front and rear track wheels 71 and 72 are journaled. Secured to the central portion of each of the track rails 66 is a pair of depending lugs 74 which are apertured to receive axle members 75 on which a pair of idlers 76 are mounted for rotation. The central portions of both track rails 66 are apertured to receive an axle member 78 which is journaled at its ends in bearing members 79 fixed to the lower ends of a pair of hangers 81, the upper portions 82 of which are apertured to receive a plurality of bolts 83 by which the two hangers are rigidly secured to the longitudinally extending frame angles 16 and 17, as best shown in Figure 7. A track guard plate 85 is fixed to the inner side of each of the two track frame bars 66.

As best shown in Figures 2, 4 and 5, the track wheels 71 and 72 receive a crawler track belt structure 90 which is made up of a plurality of links 91 pivotally interconnected by pivot pins 92. Also, each link is provided with a generally pyramidal tooth 93. Each of the wheels 71 and 72 is provided with an undulatory peripheral portion 95 which, as best shown in Figures 4 and 5, forms a plurality of three-sided sockets 96 the open sides of which face in alternately opposite directions. As mentioned, each socket 96 has three sides but the fourth side is open, forming a space *s* (Figure 5) through which any soil and the like adhering to the sides of the sockets may be forced laterally of the wheel when one of the track link teeth 93 enters the socket. Thus, there is no possibility of the sockets filling up with soil, preventing the teeth from entering the sockets, and possibly causing the links to bind or jam and the crawler track structure to fail. Although one side of each socket is open, the track is held against displacement in either direction relative to the wheels, for the reason that, first, the open side of adjacent sockets face in opposite directions, and second, there always is more than one tooth meshing with the associated wheel.

In operation, the two two-row planter frames may pivot one with respect to the other about the longitudinally extending axis defined by the pivot bolts 39 and therefore the four-row outfit will operate satisfactorily in substantially any field in which a two-row machine may be used. The front and rear frame rails 25, 26 and 31, 32 are provided with a plurality of apertures 100, as indicated in Figure 3, and the axles 41 and 42 are similarly provided with a plurality of openings 101, thus providing for fixing the frame bars 7 and 8 in different lateral positions so as to accommodate various row spacings. For example, in one form in which the invention has been incorporated, provision is thus made for adjustment for thirty-two inch, thirty-four inch and thirty-six inch row widths. The crawler track unit 5 is disposed in a position below the centrally located and fore and aft extending frame member 15, which is disposed in the horizontal planes of the planter frames, yet the unit 5 has sufficient bearing area to support the weight of the laterally inner ends of the two two-row planter units while the weight of the outer portions of these units is carried on the laterally outer ground wheels 4.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An articulated four-row planter frame comprising two two-row planter frames, one two-row planter frame including a pair of laterally spaced-apart right-hand planter-supporting frames and a pair of transversely extending right-hand front and rear rails to which the front and rear portions of said right-hand planter-supporting frames are connected, respectively, the other two-row planter frame including a pair of laterally spaced-apart left-hand planter-supporting frames and a pair of transversely extending left-hand front and rear rails to which the front and rear portions of said left-hand planter-supporting frames are connected, respectively, a support comprising a fore-and-aft extending member disposed generally in the horizontal plane of and between the laterally inner right- and left-hand planter-supporting frames, connecting means comprising transversely extending end plates fixed to the front and rear ends of said fore-and-aft extending member and receiving the inner ends of said front and rear rails, the pair of front and rear rails at one side of said member being pivoted to said end plates, the other pair of front and rear rails being rigidly secured to said end plates, each of said pairs of planter-supporting frames journaling an axle having an inner end disposed adjacent the sides of said member and an outer end extending laterally outwardly of the laterally outer planter-supporting frame, a ground wheel on the outer end of each axle, a ground-engaging track unit disposed underneath said member longitudinally thereof, a pair of hangers fixed at their upper ends to said member, and means pivotally connecting the lower ends of said hangers to said track unit.

2. An articulated four-row planter frame comprising two two-row planter frames, one two-row planter frame including a pair of laterally spaced-apart right-hand planter-supporting frames and a pair of transversely extending right-hand front and rear rails to which the front and rear portions of said right-hand planter-supporting frames are connected, respectively, the other two-row planter frame including a pair of laterally spaced-apart left-hand planter-supporting frames and a pair of transversely extending left-hand front and rear rails to which the front and rear portions of said left-hand planter-supporting frames are connected, respectively, a support comprising a fore-and-aft extending member disposed generally in the horizontal plane of and between the laterally inner right- and left-hand planter-supporting frames, connecting means comprising transversely extending end plates fixed to the front and rear ends of said fore-and-aft extending member and receiving the inner ends of said front and rear rails, the pair of front and rear rails at one side of said member being pivoted to said end plates, the other pair of front and rear rails being rigidly secured to said end plates, each of said pairs of planter-supporting frames journaling an axle having an outer end extending laterally outwardly of the laterally outer planter-supporting frame, a ground wheel on the outer end of each axle, a ground-engaging track unit disposed underneath said member longitudinally thereof, a pair of hangers fixed at their upper ends to said member, and means pivotally connecting the lower ends of said hangers to said track unit.

3. An articulated frame for a row-crop implement wherein the articulated frame is adapted to span a plurality of groups of plant rows, said articulated frame comprising two implement frame assemblies, each adapted to span a group of plant rows and each including a plurality of unit frames, one of said implement frame assemblies including a pair of laterally spaced apart unit frames and a pair of transversely extending right-hand front and rear rails to which the front and rear portions of said right-hand unit frames are connected, respectively, the other implement frame assembly including a pair of laterally spaced apart left-hand unit frames and a pair of transversely extending left-hand front and rear rails to which the front and rear portions of said left-hand unit frames are connected, respectively, a support comprising a fore-and-aft extending member disposed generally in the horizontal plane of and between the laterally inner right- and left-hand unit frames, said member comprising a pair of angles having vertical flanges arranged in back-to-back relation and a fore-and-aft extending bar disposed in a vertical position between and secured to the vertical flanges of said angles, connecting means comprising transversely extending end plates fixed to the front and rear ends of said angles and bar and receiving the inner ends of said front and rear rails, the pair of front and rear rails at one side of said member being pivoted to said end plates, the other pair of front and rear rails being rigidly secured to said end plates, each of said plurality of unit frames journaling an axle having an inner end disposed above and adjacent the sides of said member and an outer end extending laterally outwardly of the laterally outer unit frame, a ground wheel on the outer end of each axle, a ground-engaging track unit disposed underneath said member longitudinally thereof, a pair of hangers fixed at their upper ends to said member, and means pivotally connecting the lower ends of said hangers to said track unit.

4. Means for constructing an articulated row-crop implement frame from two pairs of implement unit frames, said means comprising a longitudinally extending center support including a pair of angles having vertical flanges and an elongated bar disposed in a vertical position between and secured to the vertical flanges of said angles, transversely extending elongated end plates fixed rigidly to the front and rear ends of said angles and bar, a first pair of transversely extending front and rear rails received at their laterally inner ends by said end plates, said rails and plates having a plurality of registering apertures, fastening means extending through certain of said apertures fixedly securing said rails to said end plates, a second pair of transversely extending front and rear rails having laterally inner ends pivotally connected to said end plates, ground-engaging support means underneath said center support, generally vertical bracket means fixed to said center support and receiving said ground-engaging support means; and means connecting said ground-engaging support means and said bracket means.

References Cited in the file of this patent

UNITED STATES PATENTS

| | | |
|---|---|---|
| 1,067,765 | Sherwood | July 15, 1913 |
| 1,617,967 | Schrag | Feb. 15, 1927 |
| 1,636,733 | Calkins | July 26, 1927 |
| 1,740,751 | Smith | Dec. 24, 1929 |
| 1,754,497 | Boucher | Apr. 15, 1930 |
| 1,776,860 | Krause | Sept. 30, 1930 |
| 1,901,421 | Streich | Mar. 14, 1933 |
| 2,051,162 | Cook | Aug. 18, 1936 |
| 2,101,618 | Kegresse | Dec. 7, 1937 |
| 2,199,089 | Frank | Apr. 30, 1940 |
| 2,437,312 | Bailey | Mar. 9, 1948 |